(12) United States Patent
Herzog

(10) Patent No.: US 7,693,084 B2
(45) Date of Patent: Apr. 6, 2010

(54) CONCURRENT CONNECTION TESTING FOR COMPUTATION OF NAT TIMEOUT PERIOD

(75) Inventor: Shai Herzog, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 373 days.

(21) Appl. No.: 11/711,937

(22) Filed: Feb. 28, 2007

(65) Prior Publication Data

US 2008/0205288 A1  Aug. 28, 2008

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 12/26 (2006.01)
- H04L 1/00 (2006.01)

(52) U.S. Cl. ............... 370/251; 370/241; 370/401; 709/232; 709/227; 709/228

(58) Field of Classification Search ............ 370/401, 370/241, 251; 709/232
See application file for complete search history.

(56) References Cited

U.S. PATENT DOCUMENTS

| | | | |
|---|---|---|---|
| 5,471,564 A | 11/1995 | Dennis et al. | |
| 6,401,127 B1 | 6/2002 | Lei et al. | |
| 6,405,262 B1 * | 6/2002 | Vogel et al. | 719/315 |
| 6,526,433 B1 * | 2/2003 | Chang et al. | 709/201 |
| 6,553,032 B1 | 4/2003 | Farley et al. | |
| 6,563,599 B1 | 5/2003 | Whitfield | |
| 6,687,859 B2 | 2/2004 | Robsman et al. | |
| 6,697,354 B1 | 2/2004 | Borella et al. | |
| 6,748,559 B1 | 6/2004 | Pfister et al. | |
| 6,880,089 B1 | 4/2005 | Bommareddy et al. | |
| 7,023,905 B2 * | 4/2006 | Farine et al. | 375/150 |
| 7,068,669 B2 | 6/2006 | Abrol et al. | |
| 7,139,828 B2 | 11/2006 | Alkhatib et al. | |

(Continued)

FOREIGN PATENT DOCUMENTS

JP  2002223230  8/2002

(Continued)

OTHER PUBLICATIONS

Ford, et al., "Peer-to-Peer Communication Across Network Address Translators", Date: 2005, http://www.usenix.org/events/usenix05/tech/general/full_papers/ford/ford.pdf.

(Continued)

Primary Examiner—Salman Ahmed
Assistant Examiner—Tarell Hampton

(57) ABSTRACT

Concurrent testing of NAT connections using different timeout values to compute a keep-alive value for the NAT device. Computation of the approximate timeout value is accomplished concurrently over multiple test connections within about a time equivalent to the actual NAT timeout value. The architecture validates the computation of the approximate timeout value by distinguishing NAT connection failure from external failure using a control connection. Moreover, computation of the keep-alive value is performed only once for a given NAT device rather than being an on-going process for that NAT device. When one of the test connections fails, it is determined that the NAT timeout value is less than the test timeout value associated with the failed test connection. Accordingly, a smaller test timeout value is then selected as the keep-alive value for keep-alive processing of the NAT device.

20 Claims, 11 Drawing Sheets

U.S. PATENT DOCUMENTS

| | | | |
|---|---|---|---|
| 7,249,175 B1 * | 7/2007 | Donaldson | 709/225 |
| 7,483,437 B1 | 1/2009 | Mohaban | |
| 2002/0042875 A1 | 4/2002 | Shukla | |
| 2002/0118644 A1 | 8/2002 | Moir | |
| 2002/0159463 A1 | 10/2002 | Wang | |
| 2003/0002512 A1 | 1/2003 | Kalmanek et al. | |
| 2004/0044771 A1 | 3/2004 | Allred et al. | |
| 2005/0188098 A1 * | 8/2005 | Dunk | 709/232 |
| 2005/0190754 A1 | 9/2005 | Golikeri et al. | |
| 2005/0209804 A1 * | 9/2005 | Basso et al. | 702/79 |
| 2005/0210126 A1 | 9/2005 | Friedman | |
| 2005/0210292 A1 | 9/2005 | Adams et al. | |
| 2006/0004933 A1 | 1/2006 | Sen et al. | |
| 2006/0029083 A1 | 2/2006 | Kettlewell et al. | |
| 2006/0069775 A1 | 3/2006 | Artobello et al. | |
| 2006/0072569 A1 | 4/2006 | Eppinger et al. | |
| 2006/0085548 A1 | 4/2006 | Maher, III et al. | |
| 2006/0136534 A1 | 6/2006 | Boon | |
| 2006/0160562 A1 | 7/2006 | Davis et al. | |
| 2006/0187916 A1 | 8/2006 | Vasseur et al. | |
| 2006/0277447 A1 | 12/2006 | Martin et al. | |
| 2006/0288373 A1 * | 12/2006 | Grimes et al. | 725/62 |
| 2007/0091907 A1 | 4/2007 | Seshadri et al. | |
| 2007/0115834 A1 * | 5/2007 | Cuni et al. | 370/241 |
| 2007/0140193 A1 | 6/2007 | Dosa et al. | |
| 2007/0298848 A1 * | 12/2007 | Babin | 455/574 |
| 2008/0059582 A1 | 3/2008 | Hartikainen et al. | |
| 2008/0139222 A1 | 6/2008 | Falvo et al. | |

OTHER PUBLICATIONS

Sharma, et al., "Scalable Timers for Soft State Protocols", Date:1997, http://ieeexplore.ieee.org/ie13/4979/13791/00635133.pdf?isNumber=.

Sheth, et al., "An Implementation of Transmit Power Control in 802.11b Wireless Networks", Date: Aug. 02, 2002, https://www.cs.colorado.edu/department/publications/reports/docs/CU-CS-934-02.pdf.

International Search Report for International Application No. PCT/US2008/054485 dated Aug. 12, 2008.

Beck et al., "Open Pluggable Edge Services: Requirements for OPES Callout Protocols," Internet Engineering Task Force Internet-Draft, Date: May 24, 2002.

Kalonov, Bahrom, "Mobile IP Traversal Across NAT gateways", Royal Institute of Technology/IT-University Department of Microelectronics and Information Technology, Stockholm, Sweden, Date: Jun. 15, 2002.

Zandy et al., "Reliable Network Connections," Computer Sciences Department University of Wisconsin—Madison, MOBICOM '02, Date: Sep. 23-26, 2002.

* cited by examiner

CONCURRENT CONNECTION TESTING FOR COMPUTATION OF NAT TIMEOUT PERIOD

CROSS-REFERENCE TO RELATED APPLICATIONS

This application is related to pending U.S. patent application Ser. No. 11/212,123 entitled "OUT-OF-BAND KEEP-ALIVE MECHANISM FOR CLIENTS ASSOCIATED WITH NETWORK ADDRESS TRANSLATION SYSTEMS" filed Feb. 28, 2007, the entirety of which is incorporated by reference.

BACKGROUND

Network address translation (NAT) devices provide an interface between public networks (e.g., the Internet) and private networks (e.g., home networks and business intranets). In one operational implementation, a NAT device allows multiple IP nodes on the internal private network to share a single public IP address on the public network. The NAT device translates the internal private addresses to a registered unique public address, translates the external registered address(es) to private addresses that are unique to the private network, and maps these connections through ports. NAT devices can accommodate multiple connections between the public and private networks via port mapping in a NAT address mapping and/or port mapping database or table. When a sharing node of the private domain sends outbound traffic, the NAT device forwards the traffic and creates a reverse mapping entry in the table for the sharing node. This reverse entry is used to redirect responses from the public domain back into the private domain to the correct sharing node.

Typical NAT devices have a configurable timeout period for port mapping state. If a specific table entry is not used by inbound or outbound traffic for longer than the timeout period, the NAT timer expires and the entry is purged from the table. Once the entry is purged, the sharing node in the private domain can no longer be reached over this connection and a new connection has to be initiated by the sharing node. A common mechanism to prevent the NAT timer from expiring is known as "keep-alive". Here, useless (or keep-alive) packet traffic is generated over the connection at shorter intervals than the NAT timeout period to fool the NAT into believing that the connection is active.

There are at least two conventional ways to guarantee that the keep-alive intervals are shorter than the NAT timeout intervals. First, a fixed keep-alive interval that is known to be shorter than all or most NATs on the market can be configured into the NAT device. Second, the keep-alive interval can be dynamically adjusted based on an adaptive computation (based on previous observed history). The adaptive method provides a more sophisticated technique by increasing the interval value periodically and reducing the interval if the connection fails.

In the context of mobile devices such as smart phones, for example, neither of the above approaches is satisfactory. A very short fixed interval, such as thirty seconds dramatically impacts battery life by increasing battery drain and generating significant network traffic overhead. Additionally, the on-going adaptive keep-alive mechanism is sub-optimal for mobile devices for the following reasons. If used on the main connection, the adaptive method will periodically cause a disconnect in the connection, since this is the indication that the attempted interval is too long. Even if used on a secondary connection—if done sequentially, the adaptive method takes substantial time to gather sufficient historical data to converge on the right value. Further, it is difficult to distinguish between connection failure due to NAT timeouts versus other network failures when using the adaptive method. Thus, in a low quality mobile network, the computation may fail often (e.g., due to a loss of connectivity from to roaming between networks). Finally, even when none of the other failures occur, the computed value for the adaptive method is only good as long as the mobile device is not roaming. In mobile environments, it is likely that by the time the correct interval is computed using the adaptive method, the device has already roamed to a different network.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates determination of a keep-alive value for a NAT device based on a computed approximation of the NAT timeout value. The computation is accomplished concurrently over multiple test connections within a time approximately equivalent to the NAT timeout value. Additionally, the architecture validates the computation of the keep-alive value (or approximated NAT timeout value) by positively distinguishing NAT connection failure from other forms of external failure (e.g., network). Moreover, computation of the keep-alive value can be performed only once for a given NAT device rather than being an on-going process for that NAT device. A new computation process can be automatically initiated when a new NAT device is detected. Accordingly, the innovative computation architecture drastically improves battery life and bandwidth of portable devices by reducing the processing time for determining the NAT timeout value and reducing the overhead normally associated with conventional techniques.

The architecture operates by opening multiple test connections through a detected NAT device and sending packets for progressively greater test timeout values through the different test connections. When one of the test connections fails, it is determined that the NAT timeout value is less than the test timeout value associated with the failed test connection. Accordingly, a smaller test timeout value is then selected as the keep-alive value for keep-alive processing of the NAT device.

In order to ensure that the failed connection is due to an excessively large test timeout value, one of the test connections is utilized as a control connection. In other words, if packets are received over the control connection but not one of the test connections, it can be inferred that failure of the test connection is due to the test timeout value for that connection and not from external causes, such as a network failure, for example. Accordingly, the architecture provides a validation process in parallel with finding the keep-alive value.

The testing process is performed using connections that are not currently utilized for actual data and/or applications. Moreover, the testing process does not impact operations on the connections currently being employed for the actual data and/or applications.

Once computed, the keep-alive value can be stored for use by a client and/or a server with a given NAT device for some time (NAT configuration changes very infrequently, e.g., for months and perhaps years). In other words, if a client device roams between networks that include different NAT devices, and keep-alive values have been previously computed for the different NAT devices, no more computation needs to be done. However, when the client detects a new NAT device not previously processed for a keep-alive value, the architecture automatically initiates to compute the keep-alive value for the new device.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
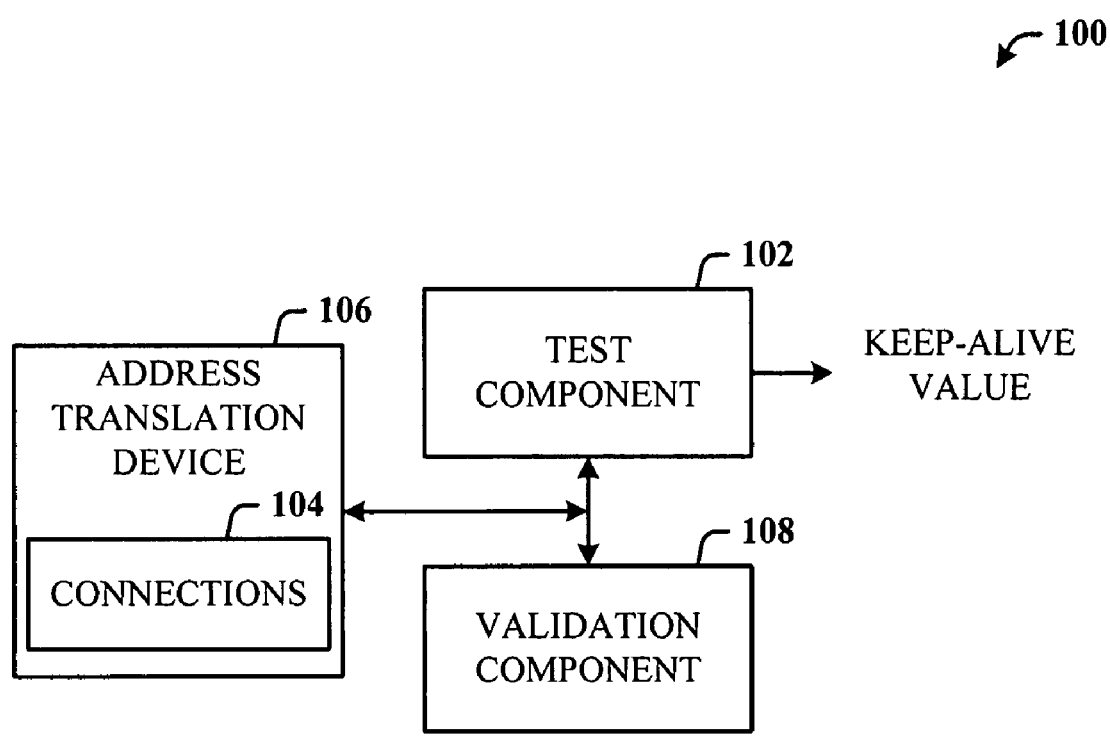
FIG. 1 illustrates a computer-implemented test and validation system that facilitates connection management for a NAT device.

The disclosed architecture facilitates computation of an approximate safe connection timeout value for use in selecting a keep-alive value for a network address translation (NAT) device based on concurrent testing of NAT connections using packets associated with different test timeout values. Additionally, the architecture validates the computation of the keep-alive value by distinguishing NAT connection failure due to a test timeout value from other forms of external events such as a network failure.

Once computed, the keep-alive value can be stored for use with a given NAT device. In other words, if a client device roams between networks that include different NAT devices, and keep-alive values have been previously computed for the different NAT devices, no more computation needs to be done. However, when the client detects a new NAT device not previously processed for a keep-alive value, computation of the keep-alive value is automatically initiated for the new device.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented test and validation system 100 that facilitates connection management for a NAT device. The system 100 comprises a test component 102 for generating test values and computing a keep-alive value by concurrently testing multiple connections 104 through an address translation device 106 (e.g., a NAT router or gateway device) as part of a test process. The system 100 also includes a validation component 108 for validating computation of the keep-alive value against one or more potential external events (e.g., network failure). In other words, during the test process it is desirable to definitively ensure that the test connection failure is due to an excessively large test timeout value rather than external causes such as a network failure, for example.

Figure 2:
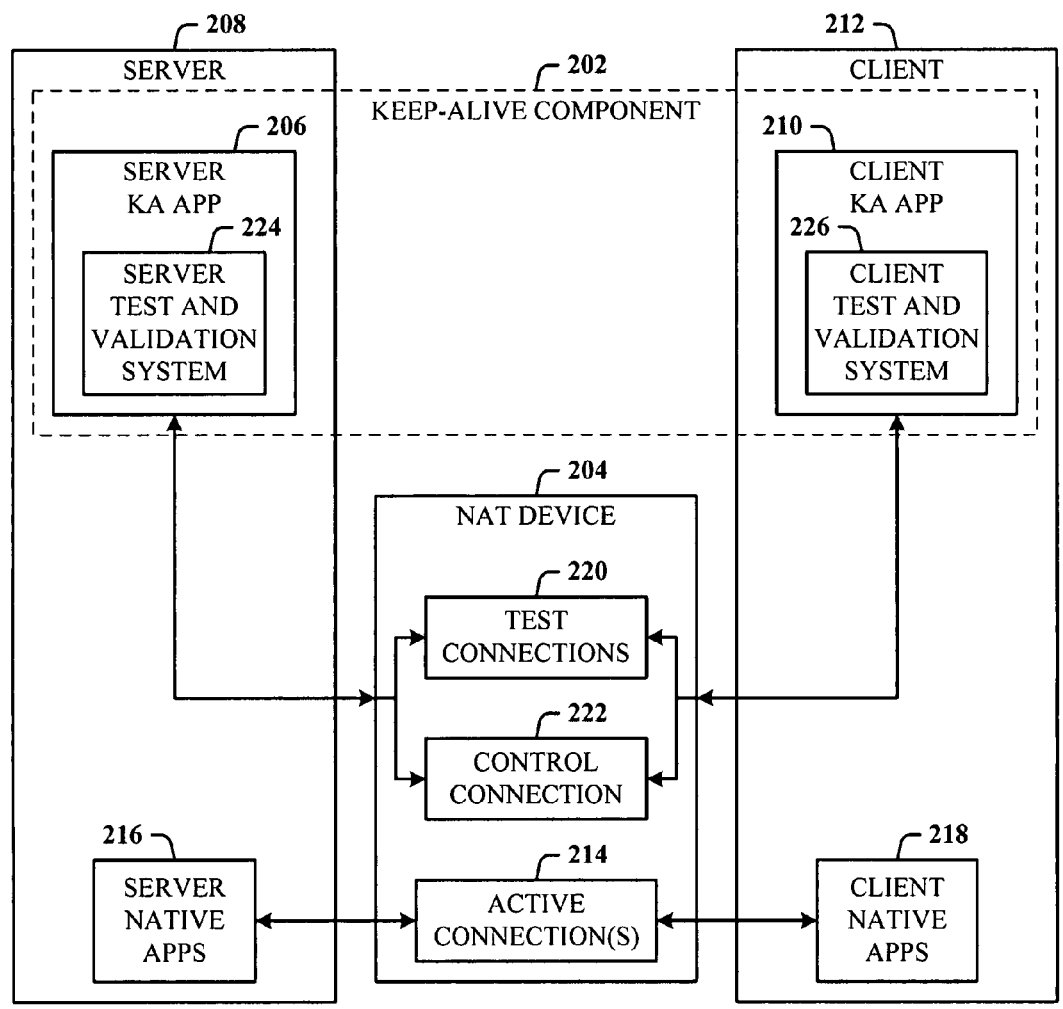
FIG. 2 illustrates an alternative system that employs the test and validation functionality as part of a keep-alive component for maintaining a connection in a NAT device.

FIG. 2 illustrates an alternative system 200 that employs the test and validation functionality as part of a keep-alive component 202 for maintaining a connection through a NAT device 204. Generally, the system 200 includes the keep-alive component 202 for maintaining the connection with keep-alive packets, but further in support thereof, by providing a means for computing a keep-alive time value for sending the keep-alive packets.

In the context of a client/server regime, the keep-alive component 202 includes a server keep-alive application 206 of a server 208 (a network entity) and a client keep-alive application 210 of a client 212 that intercommunicate to not only maintain one or more active connections 214 but also to communicate information for testing and computing of the keep-alive timeout value. The server 208 and client 212 can both also include respective native applications (216 and 218) that communicate data and/or application information through the active connection(s) 214 of the NAT device 204.

The keep-alive component 202 also includes one or more test and validation systems for opening multiple connections in the NAT device 204, which multiple connections include one or more test connections 220 and a control (or validation) connection 222, and facilitating computation of a keep-alive timeout value by determining the NAT timeout value. In this implementation, the server keep-alive application 206 includes a server test and validation system 224 and the client keep-alive application 210 includes a client test and validation system 226. Although shown and described as part of the corresponding keep-alive applications (206 and 210), it is to be understood that one or both of the server and client test and validation systems (224 or/and 226) can be designed and configured as modules external to the corresponding keep-alive applications (206 and 210).

In one exemplary operation, one of the client native applications 218 of the client 212 initiates connection to one of the server native applications 216 of the server 208 through the NAT device 204. In response thereto, the client keep-alive application 210 and server keep-alive application 206 launch. It is to be appreciated that the client and server keep-alive applications (210 and 206) may have already been launched. The client test and validation system 226 (which includes a client version of the test component 102 and validation component 108 of FIG. 1) then generates a set of N different test timeout values. The client keep-alive application 210 then opens N+1 connections in the NAT device 204 that include the test connections 220 and the control connection 222 (e.g., N test connections and one control connection).

In one implementation, the set of test values are automatically generated by the client test and validation system 226. In an alternative implementation, the set of test timeout values are hard coded into the client 212. The client 212 sends the set of test timeout values to the server test and validation system 224. This communication of test timeout values can be via one of the test connections 220 and/or the control connection 222, for example.

At the appropriate point in the test process, the server test and validation system 224 sends packets associated with the corresponding different test timeout values. The packets are sent over corresponding test connections. In other words, one of the test packets is sent over one of the connections 220 and the other duplicate of the packets or similar packet is sent over the control connection 222. If the packet sent over the control connection is received by the client 212, this validates that the network is operating correctly, insofar as this particular part of the test is concerned. Accordingly, if the packet sent over the test connection is also received at the client 212, it is then known that the test connection for that test timeout value has not failed due to the NAT timeout expiring. Thus, a larger timeout value should be tested.

This test process is performed concurrently with progressively larger test timeout values on corresponding test connections until one of the test connections fails, indicating the NAT timeout has expired. Thus, it can be assumed that the next smaller test timeout value (from the value used that caused the connection failure) can then be used as the safe keep-alive value for all connections of the NAT device 204. The keep-alive value is then used to send keep-alive packets for use on the active connections 214 of the NAT device 204.

It is to be understood that although FIG. 2 illustrates a client/server example, the concurrent testing of the NAT device 204 can be employed between two clients (e.g., the server 208 becomes a client) such that two client-based test and validation systems are employed to perform the testing.

The system 200 can operate using a reliable connection-oriented end-to-end protocol (e.g., TCP-transmission control protocol) and/or a connectionless and less reliable protocol that can provide a datagram mode of communications (e.g., UDP-user datagram protocol). When using TCP, if a packet is received on the control connection but not on the test connection, the failure is due to a NAT timeout. On the other hand, UDP is unreliable by nature, which means that it is possible that either the control packet or the test packet will be randomly dropped for no NAT-related reason. As a result, when working with UDP, reliability (or lack thereof) needs to be addressed for the purpose of this test. In other words, the server should re-send multiple UDP packets on both the control and test connections to ensure that the failure of the test connection is consistent and not random.

For example, if the client receives a test value over the test connection, it is implied that the value is safe or less than the NAT timeout value. Otherwise, if test packets are not received, the client should ask the server to retransmit X number of packets. If after X packets have been transmitted from the server the client still has not received a test packet, the client can count how many control packets were received. If the client receives most of the control packets, a conclusion is that the test channel failure is due to a NAT timeout. If the client receives no control packets or very few control packets, it can be inferred that failure is due to the network being disconnected or unreliable. Thus, once UDP unreliability can be accounted for using a different technique of test and control packet transmission, the operation is very similar to TCP.

Figure 3:
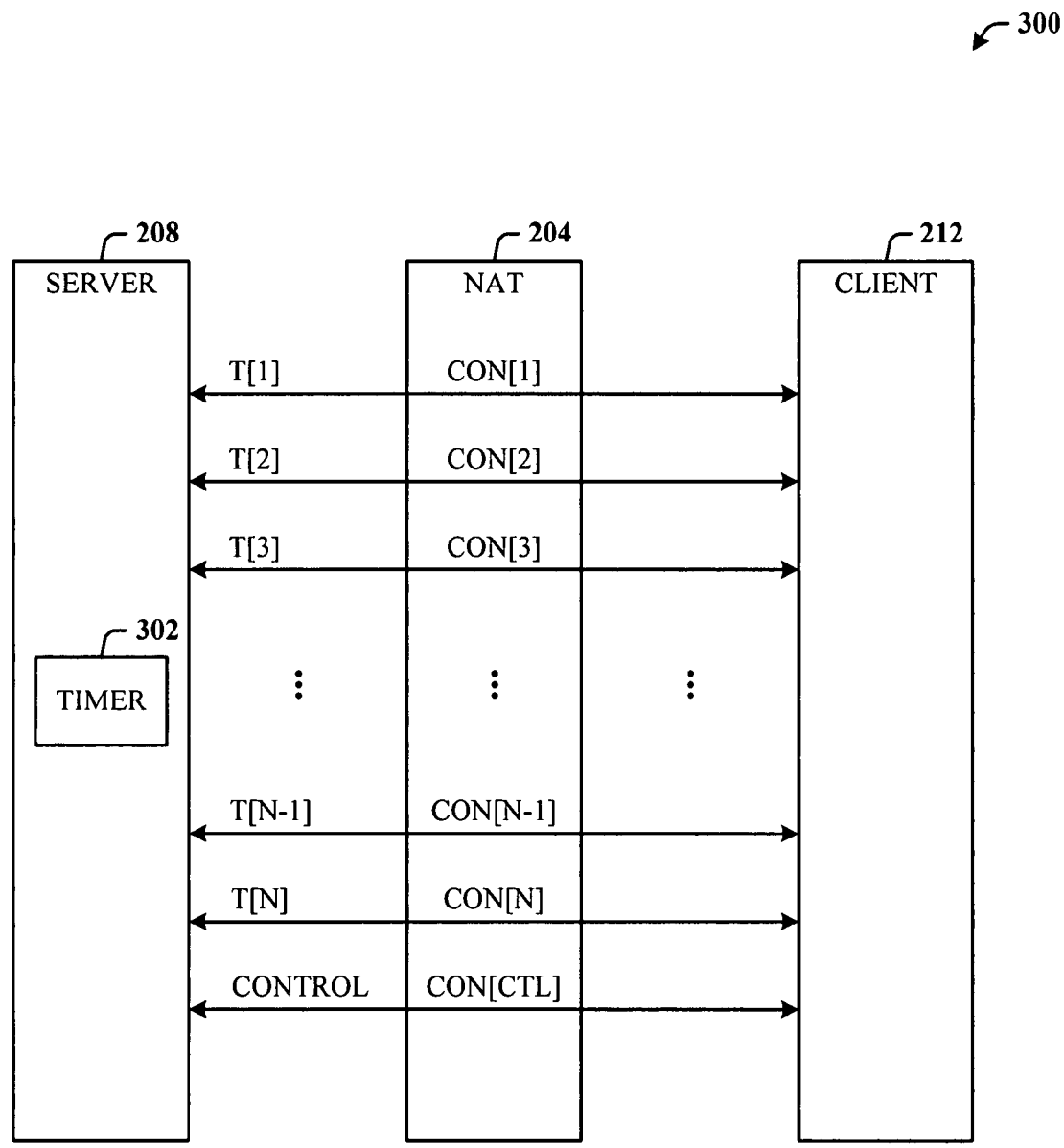
FIG. 3 illustrates a more detailed diagram for concurrent connection testing in the NAT device.

FIG. 3 illustrates a more detailed diagram 300 for concurrent connection testing in the NAT device 204. As before, although illustrated in the context of a client/server, it is to be understood that the server 208 can be replaced with a suitable client for keep-alive value computation in a peer-to-peer topology, for example. The computation can be performed generally in the following manner. The client 212 computes a set (or series) of N test (or potential) timeout values T[i] where i=N, the set of timeout values denoted by T[1] . . . T[N]. In one example implementation, the set is generated in ascending order, such as associated with timeout settings of thirty seconds, two minutes, five minutes, ten minutes, fifteen minutes, thirty minutes and fifty minutes. These sample values can be hard coded or automatically generated.

The client 212 opens up N+1 connections (e.g., UDP or TCP) to the server 208, the connections denoted CON[1] . . . CON[N−1], CON[N], and CON[CTL]. The N+1 connections include one test connection CON [i] per timeout value T[i] and one control connection CON[CTL]. The client 212 communicates the set of test timeout values T[1] . . . T[N] to the server 208 (e.g., over the control channel), and thereafter, each test timeout value is associated with one test connection (e.g., a 1:1 ratio).

Generally, a timer 302 is started from zero seconds and increments until the NAT timeout value is discovered. More specifically, for every connection i in N, as the timer 302 increments to time T[i], the server 208 sends two test packets to the client 212: one test packet on test connection i, and an identical or similar test packet on the control channel, both packets sent at time T[i]. The client 212 checks for receipt of the packets at T[i]+$T_{delta}$ (where delta is a compensation value for transmission delay and connection inaccuracies) on both the test connection and control connection. This process continues as the timer 302 increments and until the client 212 fails to receive an expected packet over the respective test connection. If the client 212 check fails for connection "i" but succeeds for the control connection, the conclusion is that T[i−1]<<NAT timeout<<T[i]. The value T[i−1] can then be selected as the safe keep-alive value for sending a keep-alive packet.

This computation is performed separately from actual/application data connections (to not disrupt application traffic). Once the test process concludes, the largest test timeout value received by the client can be utilized as the keep-alive value for keep-alive packet transmission and be safely used on actual data connections to keep those connections alive.

This disclosed algorithm achieves another goal by progressively discovering safe T[i] values that can be used for maintaining the application connections. In other words, the application connections should be refreshed with safe values only, to ensure non-disruption of the connection. As soon as the computation discovers a safe T[i], the value can be used to lower the keep-alive frequency used on actual active data connections.

The number N and the values T[1] . . . T[N] determine the granularity of the timeout detection algorithm. Increasing N will increase the number of connections and improve the temporal granularity. The values T[1] . . . T[N] determine the distribution of this granularity.

A variation on this algorithm will perform the test process several times in order to generate a higher resolution computation. For example, if the first test process computed the timeout to be between thirty and fifty minutes, a second iteration can use values of T={30, 35, 40, 45, 50} to detect the timeout with greater accuracy to be between forty and forty-five. Using a high number of N test timeout values in a single iteration versus using multiple iterations with a lower number N offers a tradeoff between computation speed and traffic overhead.

Figure 4:
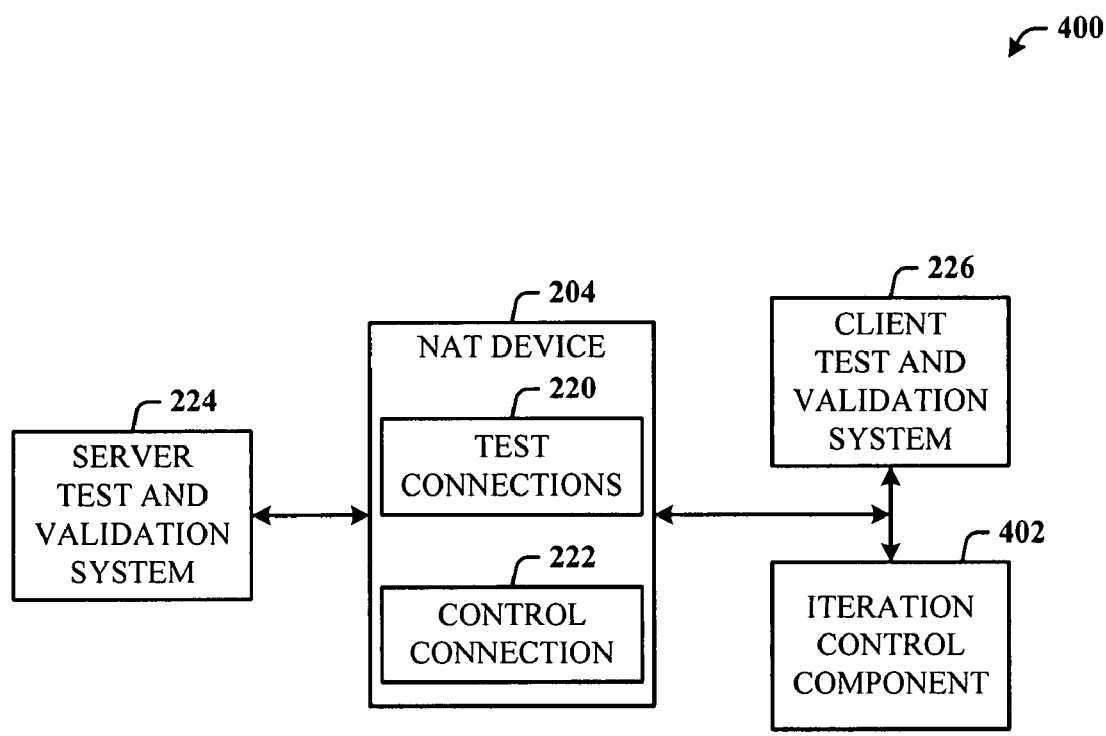
FIG. 4 illustrates an alternative keep-alive computation system.

FIG. 4 illustrates an alternative keep-alive computation system 400. The system 400 includes the server test and validation system 224 and client test and validation system 226 for computing the estimated timeout value of the NAT device 204, by concurrently testing progressively larger test timeout test values on the test connections 220. As before, the control connection 222 is used to ensure that connection failure is due to expiration of the NAT timeout rather than an external cause. Here, the system 400 also includes an iteration control component 402 for automatically making a number of decisions and determining settings related to the testing process. First, the iteration component 402 can be configured to determine if more than one iteration should be run. Second, if additional iterations are to be run, what the timeout test values T should be, based on the test values employed on the previous iteration(s). Third, the iteration component 402 can consider costs related to computation speed and traffic overhead as factors for determining which method may be optimum for the given circumstances, that is, whether to use a higher N set of test timeout values or multiple iterations.

Where computation of an optimum method is desirable, the iteration control component 402 can employ machine learning and reasoning (MLR) for example. The subject architecture (e.g., in connection with selection) can employ various MLR-based schemes for carrying out aspects thereof. For example, a process for determining which method (iterations or higher value of N) to employ can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

Figure 5:
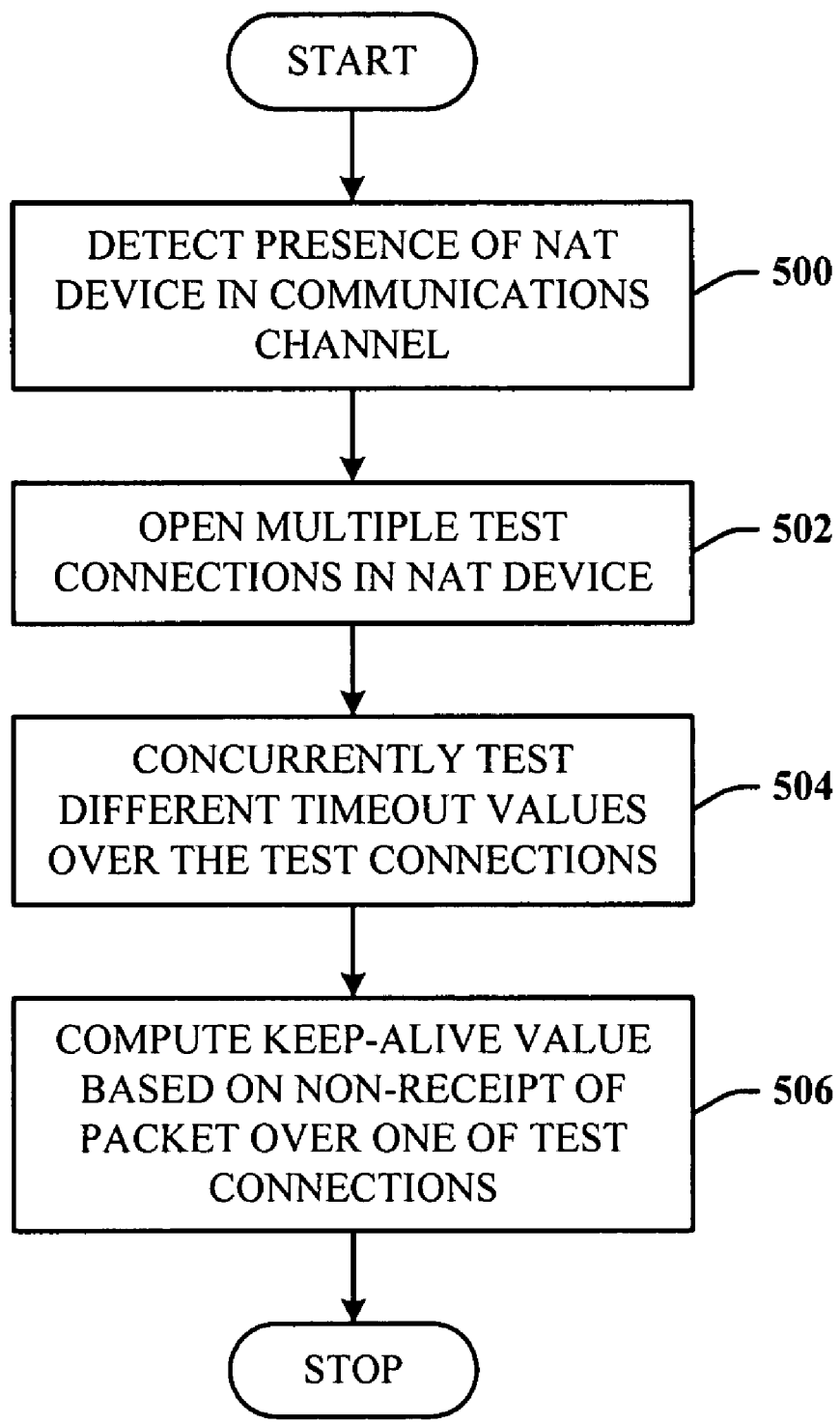
FIG. 5 illustrates a method of managing a communications connection.

FIG. 5 illustrates a method of managing a communications connection. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts in a methodology may be required for a novel implementation.

At 500, a NAT device is detected in a communications channel. At 502, multiple test connections are opened in the NAT device. At 504, different test timeout values are concurrently tested over the test connections. At 506, the keep-alive value is computed based on non-receipt of a packet over one of the test connections.

Figure 6:
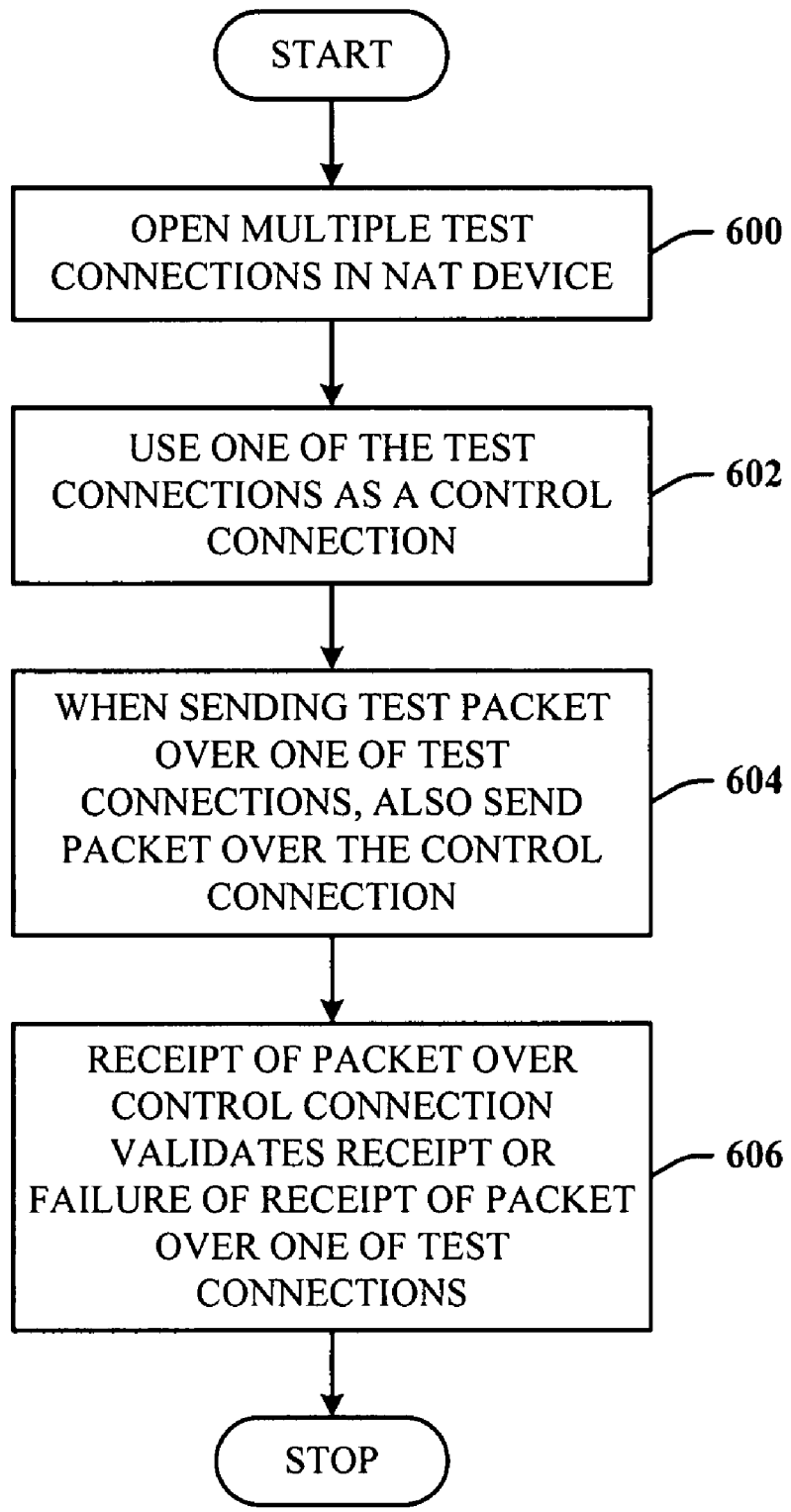
FIG. 6 illustrates a method of validating computation of the keep-alive value.

FIG. 6 illustrates a method of validating computation of the keep-alive value. At 600, multiple test connections are opened in a NAT device. At 602, one of the test connections is stipulated for use as a control connection for all other test connections. At 604, when sending a test packet over one of the test connections, a packet is also sent over the control connection. At 606, receipt of the packet over the control connection validates receipt or lack of receipt of the test packet over the test connection as being associated with an operational NAT device and not due to an external cause or event.

Figure 7:
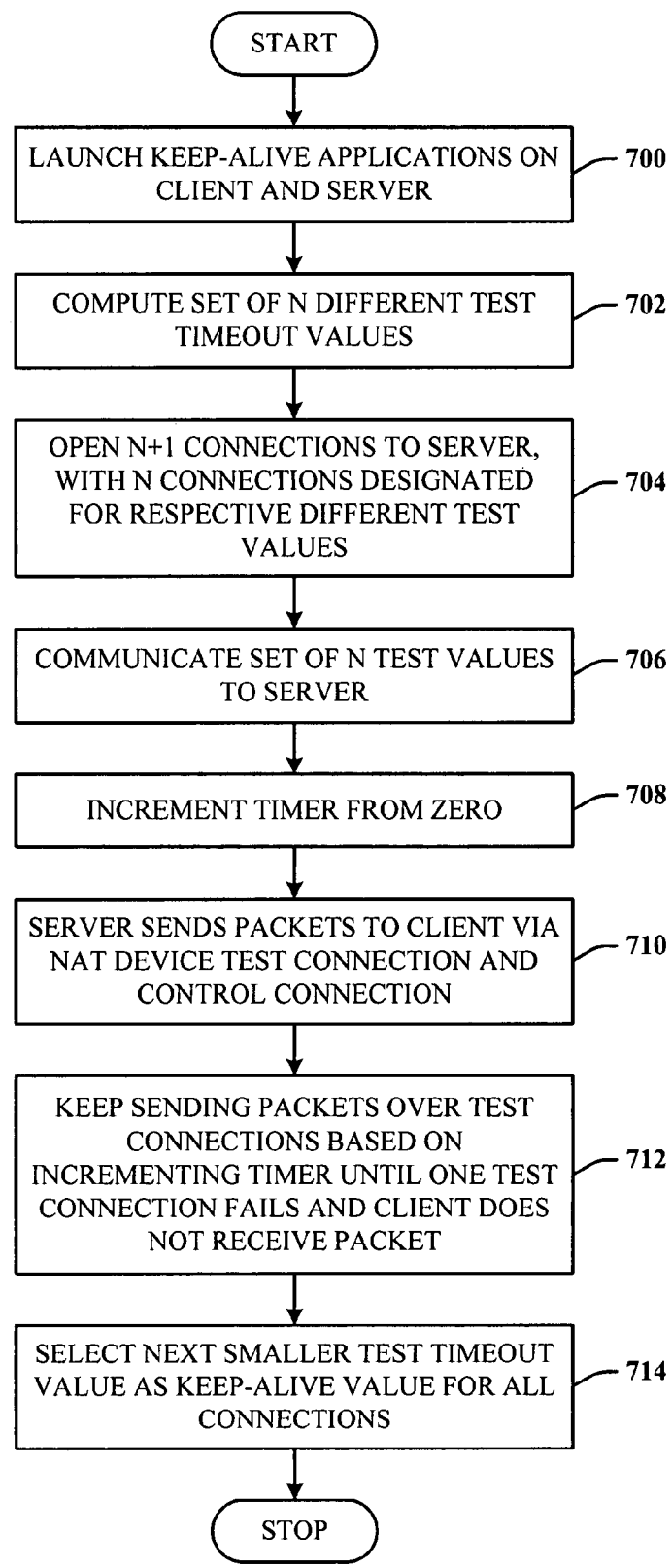
FIG. 7 illustrates a method of generating and employing test timeout values for computing an estimated NAT timeout value.

FIG. 7 illustrates a method of generating and employing test timeout values for computing an estimated NAT timeout value. At 700, client and/or server keep-alive applications launch and initiate keep-alive refresh computation. At 702, the client keep-alive application computes a set of N different and progressively larger test timeout values. At 704, the client keep-alive application open N+1 test connections where each of the N connections is designated for communicating one of the N different test timeout values, and one connection is designated as a control connection. At 706, the set of N test timeout values is transmitted from the client to the server keep-alive application. At 708, a timer starts incrementing from zero. At 710, based upon the set of N values, when the time equals a test timeout value, the server sends a pair of packets back to the client through the NAT device: one packet over one test connection associated with the designated timeout value and the other packet over the control connection. At 712, the server keeps sending packets over test connections and the control connection until one test connection fails due to the NAT timeout expiration and the client does not receive the packet over that failed connection. At 714, the next smaller test timeout value is selected as the keep-alive value for the NAT device.

It is to be appreciated that the system is not limited to selecting the next lower test timeout value. In another implementation, the second lower test timeout value from the failed timeout value is selected as the keep-alive value. This provides an extra measure of safety in the selection and use of the computed keep-alive value for native application connection communications for the NAT device.

Figure 8:
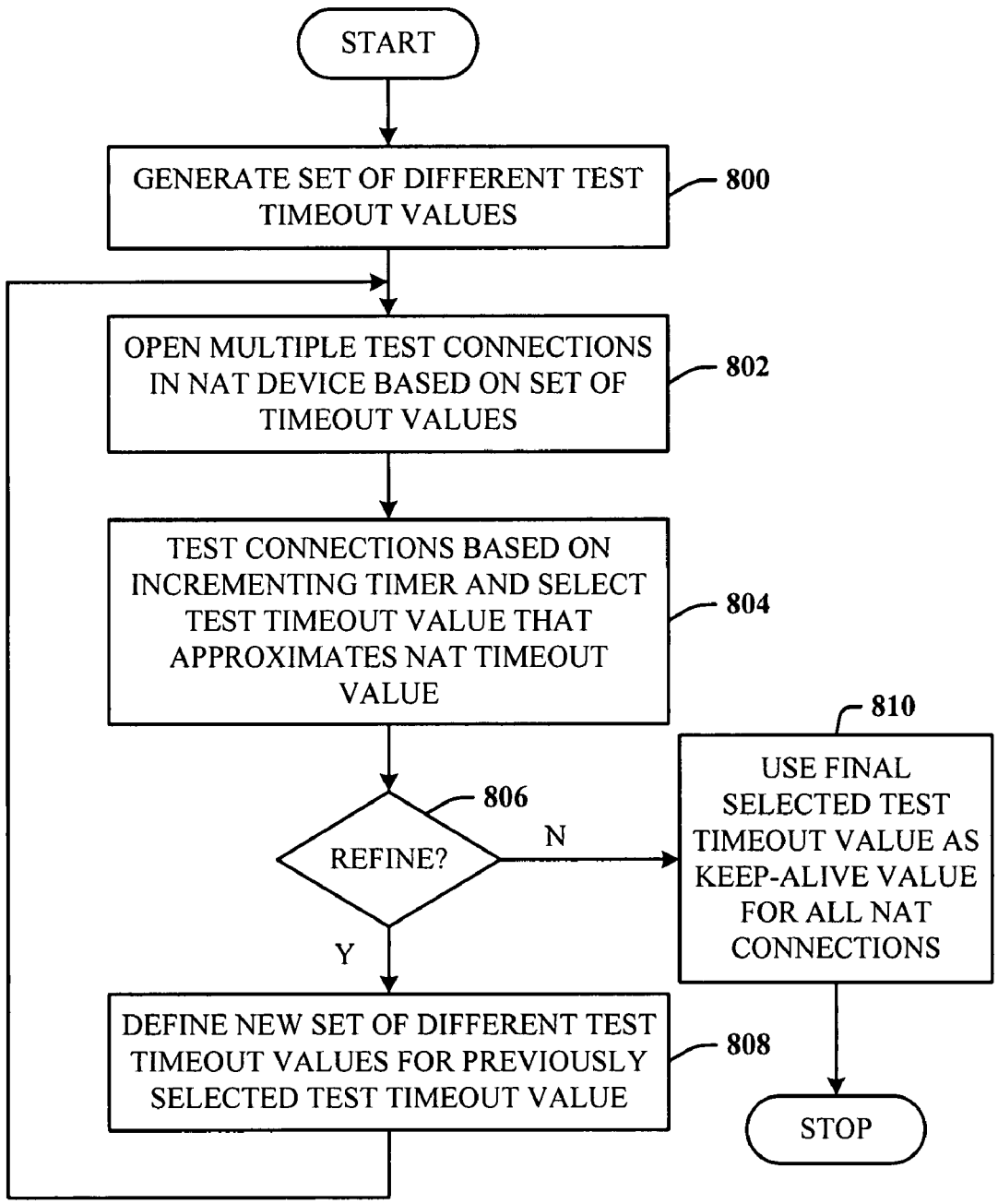
FIG. 8 illustrates a method of refining computation of the estimated NAT timeout value for keep-alive processing.

FIG. 8 illustrates a method of refining computation of the estimated NAT timeout value for keep-alive processing. At 800, a set of different test timeout values is generated. At 802, multiple test connections are opened in the NAT device based on the number of different test timeout values. At 804, the connections are tested based on incrementing a timer and selecting a test timeout value that approximates the NAT timeout value. At 806, a check is made to determine if further refinement of the selected timeout value is desired. If so, at 808, a new set of different test timeout values are defined for the previously selected test timeout value. Flow is then back to 802 to open NAT connections and test the new set of timeout values for a more precise timeout value, as indicated at 804. If no further refinement is desired, flow is from 806 to 810 to use the final test timeout value as the keep-alive value for all NAT connections.

Figure 9:
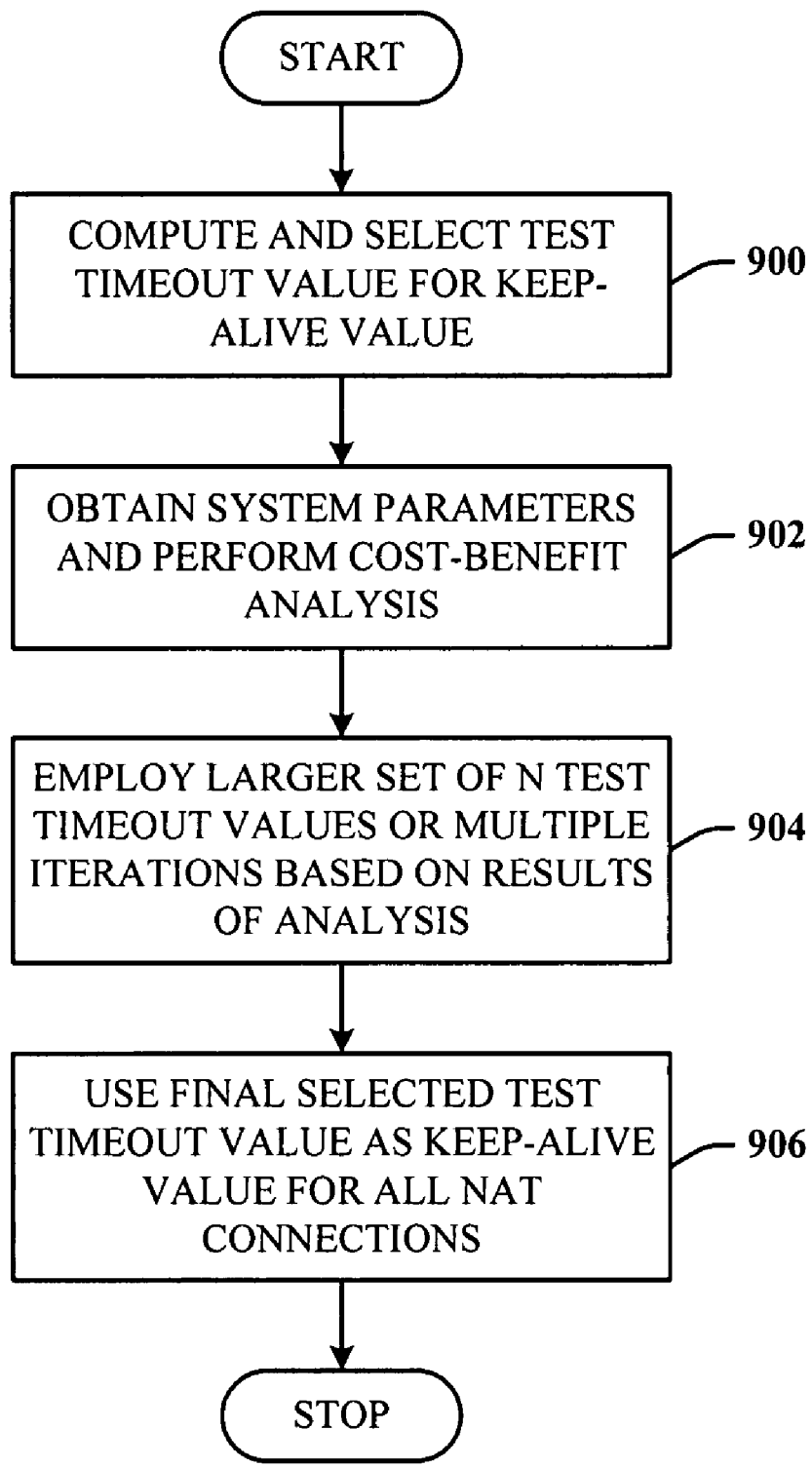
FIG. 9 illustrates a method of selecting an optimum method using cost-based analysis.

FIG. 9 illustrates a method of selecting an optimum method using cost-based analysis. At 900, a test timeout value is computed, tested and selected for the keep-alive value. At 902, system parameters are then obtained and a cost-benefit analysis is performed to determine which of at least two methods to be employed. At 904, the system employs a larger set of N test timeout values or multiple iterations using different test timeout values based on the results of the analysis. At 906, the final selected test timeout value is used as the keep-alive value for all NAT connections.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
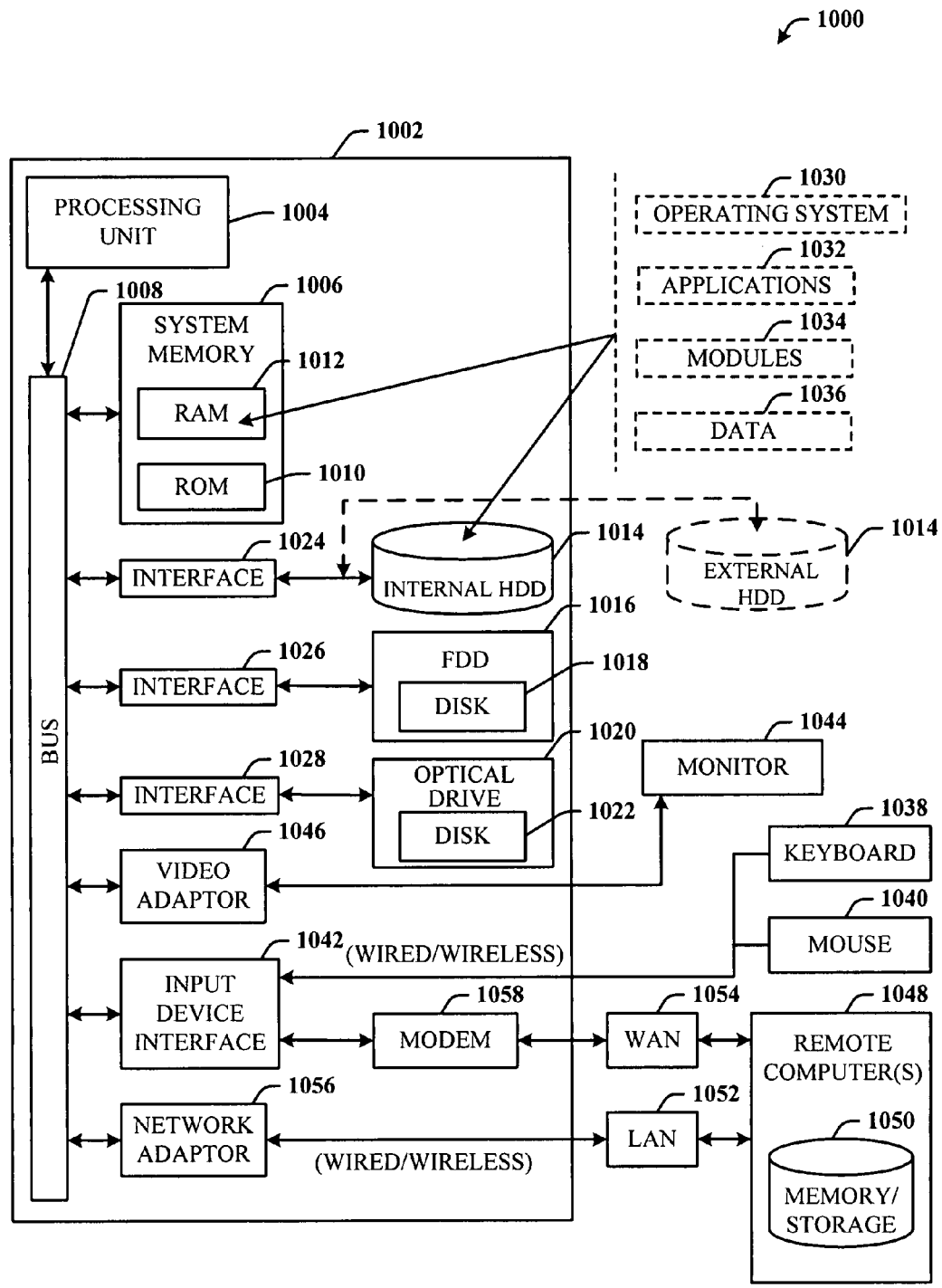
FIG. 10 illustrates a block diagram of a computing system operable to compute the estimated NAT timeout value based on concurrent testing of the different timeout values.

Referring now to FIG. 10, there is illustrated a block diagram of a computing system 1000 operable to compute the estimated NAT timeout value based on concurrent testing of the different timeout values. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed architecture.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the disclosed architecture can be implemented with various commercially available operating systems or combinations of operating systems.

The applications 1032 and/or modules 1034 can include the components for computing the approximate NAT device timeout value and keep-alive value such as the test component 102 and validation component 108 of FIG. 1, the keep-alive component 202, client and server keep-alive applications (224 and 226), the server and client test and validation systems (224 and 226) of FIG. 2, and the iteration control component 402 of FIG. 4.

A user can enter commands and information into the computer 1002 through one or more wired/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the local network 1052 through a wired and/or wireless communication network interface or adaptor 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 11:
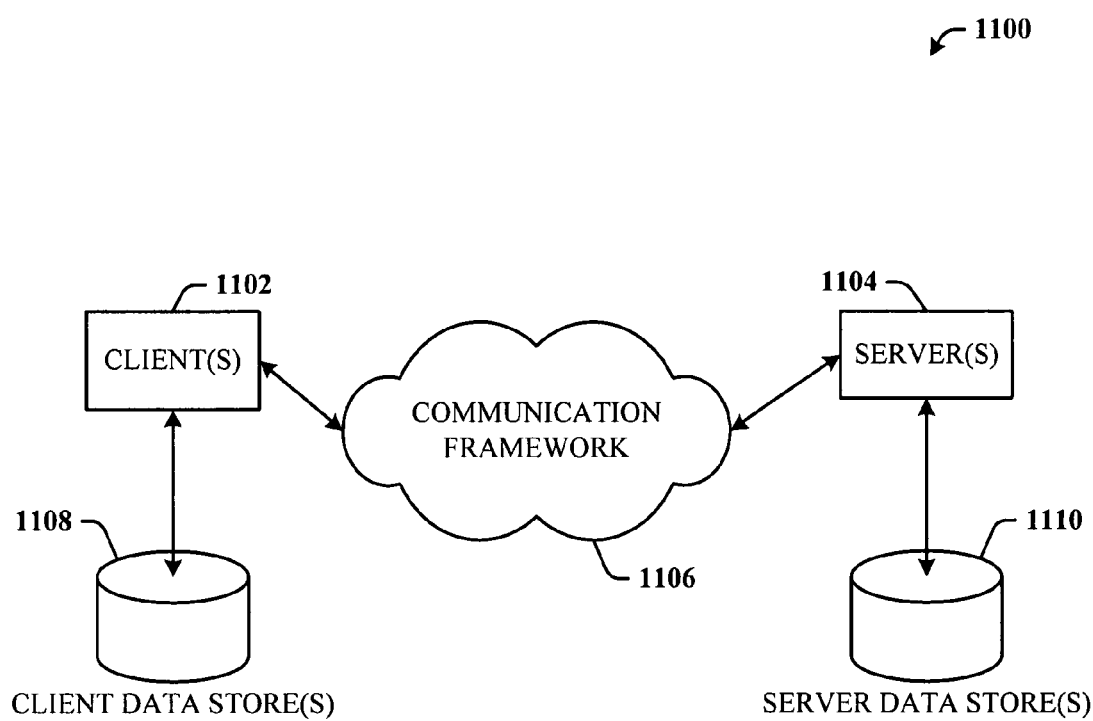
FIG. 11 illustrates a schematic block diagram of an exemplary computing environment for computing the estimated NAT timeout value based on concurrent testing of the different timeout values.

Referring now to FIG. 11, there is illustrated a schematic block diagram of an exemplary computing environment 1100 for computing the estimated NAT timeout value based on concurrent testing of the different timeout values. The system 1100 includes one or more client(s) 1102. The client(s) 1102 can be hardware and/or software (e.g., threads, processes, computing devices). The client(s) 1102 can house cookie(s) and/or associated contextual information, for example.

The system 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The clients 1102 can include wireless devices operating in the private domain of the NAT device while the server 1104 can be those which operate in the public domain. Accordingly, both the clients 1102 and the servers 1104 can include the respective test and validation systems (226 and 224) of FIG. 2.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates connection management, comprising:
   a test component for computing a keep-alive value of an address translation device as part of a test process by concurrently testing multiple connections comprising at least a control connection and one or more test connections through the address translation device, wherein the test component:
   generates a set of different test time out values,
   sends packets associated with the different test time out values over the control connection and the one or more test connections, and
   computes the keep-alive value for the address translation device based on a test time out value associated with a packet received over at least one test connection when a packet associated with a higher test time out value is not received over the at least one test connection; and
   a validation component for validating computation of the keep-alive value against an external event, wherein the validation component:
   checks whether a packet associated with the higher test time out value was received over the control connection, and
   validates the test time out value associated with the packet received over the at least one test connection against the external event if the packet associated with the higher test time out value was received over the control connection.

2. The system of claim 1, wherein the test component performs the test process via a client device of a private network.

3. The system of claim 2, wherein the test component of the client generates a set of progressively larger test timeout values and opens the multiple connections based on the set of test timeout values.

4. The system of claim 1, wherein the address translation device is a network address translation (NAT) device that interfaces a server of a public network to a client of a private network.

5. The system of claim 1, wherein the validation component employs the control connection to eliminate network failure as a factor in the computation of the keep-alive value.

6. The system of claim 1, wherein the test component generates a set of N different test timeout values, where N is a positive integer, and opens N+1 connections comprising N test connections and the control connection as the multiple connections utilized for the test process.

7. The system of claim 1, wherein the multiple test connections are distinct from active data connections of the address translation device.

8. The system of claim 1, wherein the test component injects packets associated with progressively larger test timeout values into corresponding test connections of the multiple connections for communication to a client.

9. The system of claim 8, wherein the test component sends the packets in accordance with an incrementing timer, one of the packets sent over a test connection and one packet sent over the control connection.

10. The system of claim 9, wherein the test component selects a smaller test timeout value as the keep-alive value when the packet associated with the higher test time out value sent over the at least one test connection is not received.

11. The system of claim 1, wherein the multiple test connections facilitate TCP or UDP protocol communications.

12. A computer-implemented method of managing a communications connection, comprising acts of:
   opening multiple connections in a NAT device of a communications channel, the multiple connections comprising at least a control connection and one or more test connections;
   generating a set of different test timeout values;
   sending packets associated with the different test time out values over the control connection and the one or more test connections; and
   computing a keep-alive value for the NAT device based on a test time out value associated with a packet received over at least one test connection and non-receipt of a packet associated with a higher test time out value over the at least one test connection;
   checking whether a packet associated with the higher test time out value was received over the control connection; and
   validating the test time out value associated with the packet received over the at least one test connection if the packet associated with the higher test time out value was received over the control connection.

13. The method of claim 12, further comprising validating operation of the test connections based on receipt of packets over the control connection.

14. The method of claim 12, further comprising applying the keep-alive value to active data connections of the NAT device.

15. The method of claim 12, further comprising concurrently testing over the control connection and the one or more test connections while an active data connection passes native data.

16. The method of claim 12, further comprising increasing a number of the test connections and a corresponding number of test timeout values to provide more precise computation of NAT timeout value.

17. The method of claim 12, further comprising computing the keep-alive value based on a previous keep-alive value to provide a higher resolution keep-alive value relative to a NAT timeout value of the NAT device.

18. The method of claim 12, further comprising automatically determining when to employ multiple iterations using N different test timeout values, where N is a positive integer, or a single iteration with a larger number of test timeout values.

19. The method of claim 12, further comprising selecting a smaller test timeout value from the set of the different test timeout values as the keep-alive value based on the non-receipt of the packet associated with the higher test time out value over the at least one test connection.

20. A computer-implemented system, comprising:
   computer-implemented means for opening multiple connections in a NAT device of a communications channel, the multiple connections comprising at least a control connection and one or more test connections;
   computer-implemented means for generating a set of progressively larger test timeout values;
   computer-implemented means for sending test packets associated with the progressively larger test time out values over the one or more test connections;

computer-implemented means for concurrently sending control packets associated with the progressively larger test time out values over a control connection;

computer-implemented means for computing a keep-alive value for the NAT device based on a test time out value associated with a test packet received over at least one test connection and non-receipt of a test packet associated with a higher test time out value over the at least one test connection;

computer-implemented means for checking whether a control packet associated with the higher test time out value was received over the control connection; and computer-implemented means for validating the test time out value associated with the test packet received over the at least one test connection if the control packet associated with the higher test time out value was received over the control connection.

* * * * *

UNITED STATES PATENT AND TRADEMARK OFFICE
CERTIFICATE OF CORRECTION

| | | |
|---|---|---|
| PATENT NO. | : 7,693,084 B2 | |
| APPLICATION NO. | : 11/711937 | |
| DATED | : April 6, 2010 | |
| INVENTOR(S) | : Shai Herzog | |

It is certified that error appears in the above-identified patent and that said Letters Patent is hereby corrected as shown below:

In column 1, line 7, delete "11/212,123" and insert -- 11/712,123 --, therefor.

Signed and Sealed this
Eighth Day of February, 2011

David J. Kappos
*Director of the United States Patent and Trademark Office*